(No Model.)

F. E. SOUTHARD.
VEHICLE WHEEL.

No. 414,782. Patented Nov. 12, 1889.

Witnesses.
L. G. Welker.
P. S. Slack.

Inventor.
Frank E. Southard
By Simon Hall
Attorney.

UNITED STATES PATENT OFFICE.

FRANK EDWARD SOUTHARD, OF TOLEDO, OHIO.

VEHICLE-WHEEL.

SPECIFICATION forming part of Letters Patent No. 414,782, dated November 12, 1889.

Application filed July 11, 1889. Serial No. 317,145. (No model.)

*To all whom it may concern:*

Be it known that I, FRANK EDWARD SOUTHARD, of Toledo, Lucas county, Ohio, have invented a new and useful Improvement in Vehicle-Wheels, of which the following is a specification.

My invention relates to the hub of a wheel in which the spokes are formed of wire, and more particularly to the plates for forming the hub of such wheel and the manner of securing in the hub the diverging spoke-wires and method of fastening the plates of the hub together.

The object of my invention is to provide a cheap, simple, light, strong, durable hub, which may be readily taken apart to admit of the introduction of new spokes in the case of breakage. I attain these objects by means of the device illustrated in the accompanying drawings, made a part hereof, in which—

Figure 1:
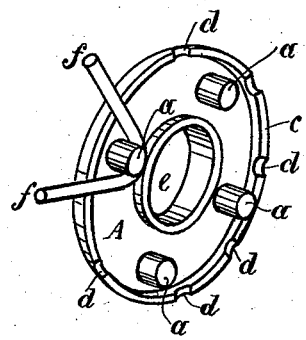
Figure 2:
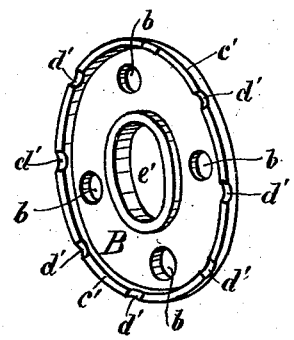
Figure 3:

Figure 1 is a perspective view of the inner surface of one of the plates of my hub; Fig. 2, the inner surface of the other plate of the same, and Fig. 3 a sectional central longitudinal view of the completed hub.

My hub is formed of two disk-like plates A and B, made, preferably, of malleable iron. These plates, when the two inner sides are brought together, have a flat circular recess between them of the same thickness as the wire spokes to be received. Plate A is provided on its inner surface with projecting lugs or spurs $a$, a rim $c$, having notches $d$, and has a hole $e$ through its center to receive the vehicle-axle. Plate B has the holes $b$ through it, coinciding with lugs or spurs $a$ on plate A, and also has on its inner surface a rim $c'$, having notches $d'$, corresponding with the rim and notches on plate A. Plate B has also a central axle-bore $e'$, coinciding with the aperture $e$ in plate A. Each lug or spur $a$ engages the bent or looped wire $f$, bent to form two spokes of the wheel, as shown in Fig. 1. Wire $f$ passes from the hub through notches $d\ d'$, the bent wires being looped, one over each lug, on plate A. The inner faces of the plates A and B are brought together, so that lugs $a$ pass through apertures $d$, and so that the notches in the rims of the two plates coincide. The loops of the wires rest in the recess between the two plates engaging the lugs, and lead from the periphery of the hub through the openings formed by the notches in the inwardly-projecting rims of the plates A B. The ends of the lugs $a$, projecting through apertures $b$, are now upset or riveted, thus drawing the two plates A B tightly together and holding the wires firmly in place; or the lugs $a$ may be threaded at their extremities, and plates A and B may be secured together by means of nuts on such threaded lugs; but I prefer the method above described. Two of the devices here described are used in each wheel, the axle passing through both, and the wire spokes of each converging into the single rim. The methods of uniting these pairs into a single hub, of providing for tightening the wire spokes by spreading the pairs of plates apart upon a threaded sleeve, and of attaching the outer end of the wire spokes to the rim of the wheel are all well known, and need not be here described.

What I claim as my invention, and desire to secure by Letters Patent, is—

1. In a wheel-hub, the two plates A B, plate A, having projecting lugs $a$ passing through apertures $b$ from plate B, the two plates being drawn and secured together by riveting or upsetting the extremity of said lugs $a$, substantially as shown and described, for the purpose specified.

2. In a wheel-hub, plate A, having lugs or spurs $a$, each adapted to engage a wire bent to form two spokes, and the plate B, having apertures $b$, adapted to receive the projecting lugs $a$ on plate B, in combination with wire spokes $f$, substantially as shown and described, for the purpose specified.

FRANK EDWARD SOUTHARD.

In presence of—
    WALTER R. EMERY,
    CHARLES D. WOODBRIDGE